(12) United States Patent
Annampedu

(10) Patent No.: US 7,586,704 B2
(45) Date of Patent: Sep. 8, 2009

(54) METHOD AND APPARATUS FOR IMPROVING THRESHOLD DETECTION OF SERVO DATA IN THE PRESENCE OF SIGNAL ASYMMETRY

(75) Inventor: Viswanath Annampedu, Schnecksville, PA (US)

(73) Assignee: Agere Systems Inc., Allentown, PA (US)

( * ) Notice: Subject to any disclaimer, the term of this patent is extended or adjusted under 35 U.S.C. 154(b) by 659 days.

(21) Appl. No.: 11/359,656

(22) Filed: Feb. 22, 2006

(65) Prior Publication Data

US 2007/0195444 A1 Aug. 23, 2007

(51) Int. Cl.
*G11B 5/09* (2006.01)
(52) U.S. Cl. .......................... 360/39; 360/65
(58) Field of Classification Search ........................ None
See application file for complete search history.

(56) References Cited

U.S. PATENT DOCUMENTS

| | | | |
|---|---|---|---|
| 6,693,863 B2 * | 2/2004 | Shoji et al. ............... | 369/47.35 |
| 7,102,839 B2 * | 9/2006 | Berman et al. ................ | 360/48 |
| 7,106,533 B2 * | 9/2006 | Eleftheriou et al. ........... | 360/39 |
| 7,161,522 B1 * | 1/2007 | Altekar et al. ............... | 341/155 |
| 2002/0180628 A1 * | 12/2002 | Asano et al. ................. | 341/139 |

* cited by examiner

*Primary Examiner*—Jason C Olson
(74) *Attorney, Agent, or Firm*—Mendelsohn, Drucker & Associates, PC; Steve Mendelsohn

(57) ABSTRACT

An adaptive asymmetry control circuit is described. Such a circuit may be used in magnetic recording applications, for example. The adaptive asymmetry control circuit uses a peak detector which supplies at regular intervals positive or negative signal peak values of an equalized sampled data stream. An asymmetry learning function generates a summation of N pairs of positive and negative signal peak values divided by N as an average signal asymmetry value. The average signal asymmetry value is divided by 2 in an optimal threshold function producing an optimal threshold value. Then a threshold detector, that uses the optimal threshold value as a threshold, slices the sampled data stream at regular intervals.

20 Claims, 4 Drawing Sheets

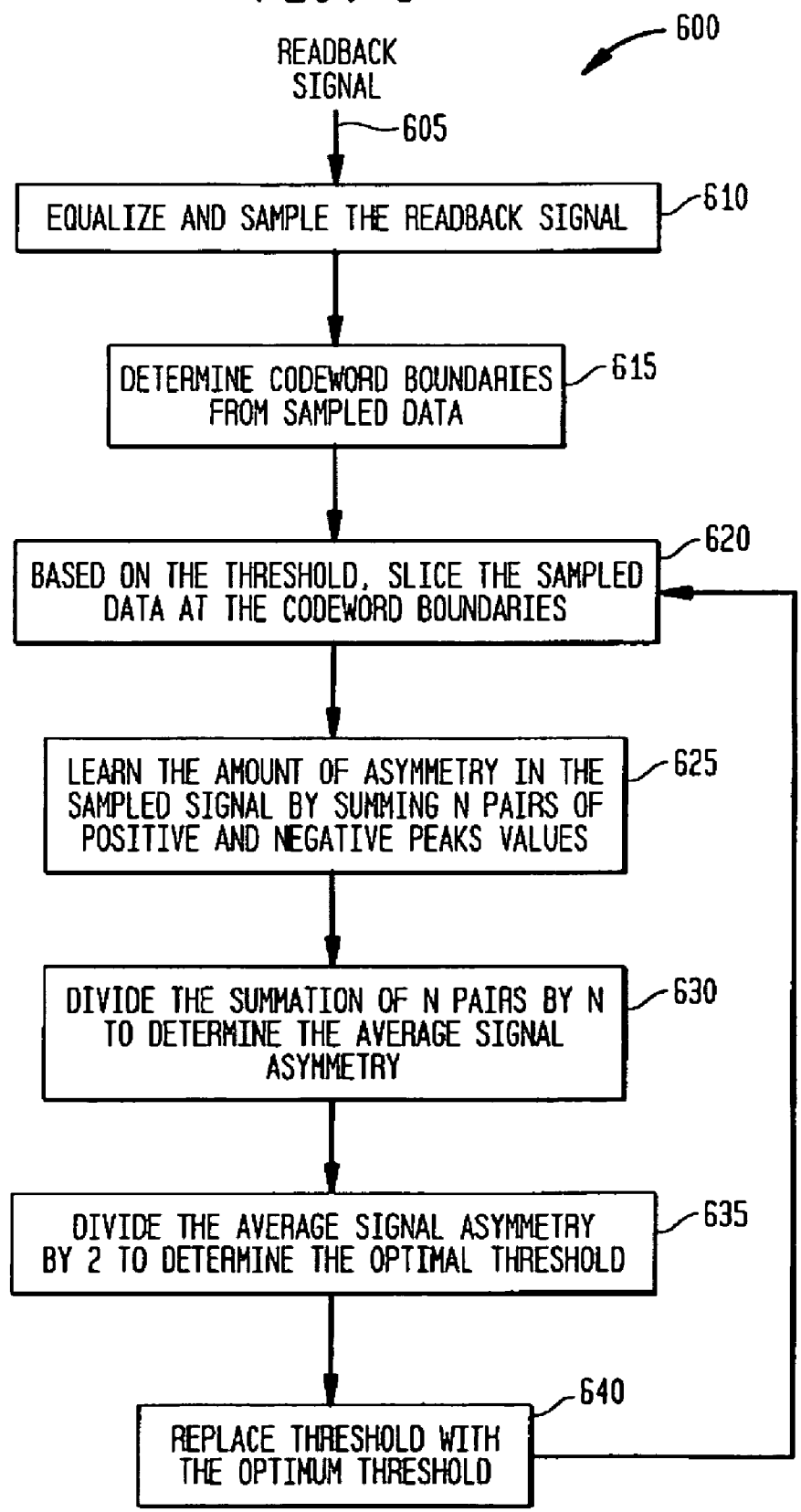

US 7,586,704 B2

METHOD AND APPARATUS FOR IMPROVING THRESHOLD DETECTION OF SERVO DATA IN THE PRESENCE OF SIGNAL ASYMMETRY

FIELD OF INVENTION

The present invention relates generally to improved signal acquisition methods and apparatus, and more particularly to advantageous techniques for adaptive signal asymmetry control in magnetic recording systems.

BACKGROUND OF INVENTION

Digital magnetic recording stores digital data by modulating a magnetic flux pattern on a magnetic medium. During the storing process, an electric current in a write head is modulated based on the digital data to be written. The head is positioned over magnetic material in the shape of a circular disk, which rotates rapidly. The electric current in the write head, in turn, modulates the magnetic flux pattern on the medium. The medium used is such that the flux pattern is retained in the medium after the electric current is turned off in the write head, thus providing data storage.

Data is usually written on the medium in concentric circles called tracks, which are further divided into user or read data sectors and servo sectors embedded between the read data sectors. The servo sectors contain data and supporting bit patterns required for control and synchronization. The control and synchronization information is used to position the magnetic recording head on track, so that the information stored in the read data sectors can be retrieved properly.

During a read process, a read head is positioned over the medium following the tracks, but now the magnetic flux pattern on the medium induces a current in the read head. This current is then processed to recover the written data. More specifically, an analog signal path (including filtering, amplification, and timing stages) processes the signals from the read head. The read process begins with reading synchronization bit patterns containing, for example, preamble symbols, a servo address mark, and a number of other fields that are used for head positioning and other purposes, such as providing track number and sector information.

Read heads, such as, magnetoresistive read heads, may produce signals having asymmetric properties when reading the data, including servo data. Since the servo sector data is a relatively short data field, traditional techniques to compensate for signal asymmetry using least mean squared error adaptive techniques, for example, would typically fail to adequately compensate for asymmetry in the servo data. The least mean squared error adaptive techniques are more suited for long non-periodic data patterns for proper operation.

SUMMARY OF INVENTION

Among its several aspects, the present invention recognizes that there is a need for accurately addressing signal asymmetry in servo systems. By way of example, such circuits may be advantageously employed in a read-channel front end of a recording disk drive system.

To these ends, an embodiment of the present invention uses a control circuit for adaptively controlling signal asymmetry having a peak detector operable to supply at regular intervals positive or negative signal peak values of a sampled data stream. An asymmetry learning function operable to generate an average signal asymmetry value by averaging N pairs of positive and negative signal peak values. The average signal asymmetry value is divided by 2 in an optimal threshold function producing an optimal threshold value. A threshold detector operable to slice the sampled data stream at regular intervals using the optimal threshold value as a threshold.

Another embodiment of the present invention addresses a method for adaptively controlling signal asymmetry in a disk drive system. In this embodiment, the method begins by detecting at regular intervals positive or negative signal peak values of a sampled data stream. Then, N pairs of positive and negative peak values are added to produce a summation value. The summation value is divided by N to produce an average signal asymmetry value. The average signal asymmetry value is then divided by 2 to produce an optimal threshold value. Using the optimal threshold value as a threshold, the sampled data stream is sliced at regular intervals in a threshold detector.

A more complete understanding of the present invention, as well as other features and advantages of the invention, will be apparent from the following detailed description and the accompanying drawings.

BRIEF DESCRIPTION OF DRAWINGS

FIG. 6 illustrates an adaptive asymmetry control process in accordance with the present invention.

DETAILED DESCRIPTION

The present invention will now be described more fully with reference to the accompanying drawings, in which several embodiments and various aspects of the invention are shown. This invention may, however, be embodied in various forms and should not be construed as being limited to the embodiments set forth herein. Rather, these embodiments are provided so that this disclosure will be thorough and complete, and will fully convey the scope of the invention to those skilled in the art.

Figure 1:
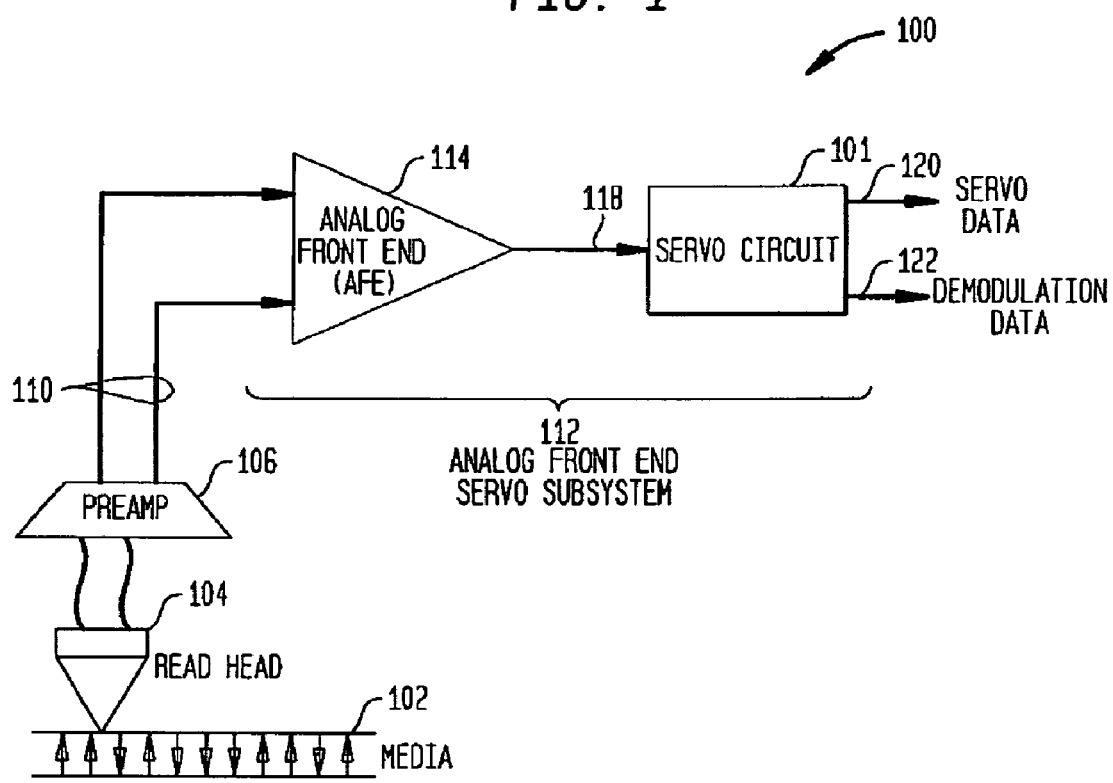
FIG. 1 illustrates an exemplary analog subsystem for a perpendicular recording disk drive system utilizing a servo circuit in accordance with the present invention.

FIG. 1 illustrates an exemplary analog subsystem 100 for a perpendicular recording disk drive system utilizing a magnetoresistive (MR) read head and a servo circuit 101 in accordance with the present invention. It will be appreciated that other systems and analog front end subsystems may benefit from the teachings of the present invention. For example, horizontal recording disk drive systems and the like may also benefit from aspects of the present invention.

The design of the analog subsystem 100 for use in a perpendicular recording disk drive system is quite a bit different than those for a subsystem for use in conjunction with a horizontal recording technique, which is the primary recording technology used in the most common present day disk drives. The perpendicular recording technology stores data in closely packed vertical magnetized units in sectors on a media 102, such as a read/write disk. An MR read head 104, designed for use with perpendicular recorded media 102, senses the vertical magnetized units to produce a signal that is coupled to a read head circuit containing a preamplifier or preamp 106, which provides a first stage of amplification of the MR read head signal.

Synchronization bits typically are stored at the beginning of a servo sector on a disk. The synchronization bits typically are used when reading data stored in the sector. As illustrated in FIG. 1, preamp 106 can be located close to the MR read head 104 and can provide a differential output 110 to drive the amplified signal to an analog front end servo subsystem 112 which might be suitably located on a disk drive card, for example. In one embodiment, analog front end (AFE) 114 may include an equalizer (not shown), and an analog to digital converter (ADC) (not shown) to process the preamp signal 110. Such processing may include removing most of any DC offset that may be part of the preamp signal 110 and providing an adequate amount of gain so that the amplified signal can be suitably processed by the servo circuit 101. Output 118 from AFE 114 is connected as an input to the servo circuit 101. The servo circuit 101 provides additional signal processing functions to provide the information needed to position the MR read head as required by the recording system. To such ends, the servo circuit 101 generates servo data and demodulation data (illustrated as outputs 120 and 122, respectively), which then can be further processed and analyzed.

Figure 2:
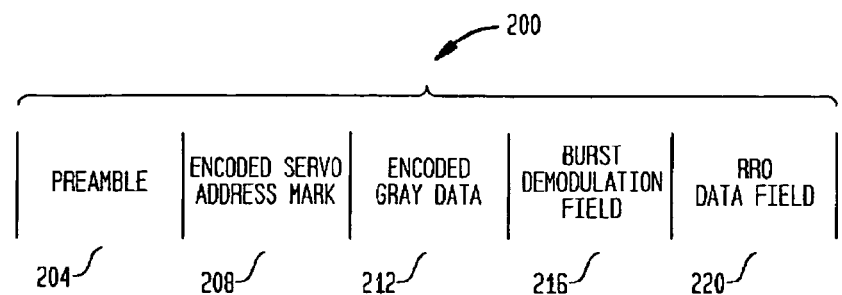
FIG. 2 illustrates an exemplary servo sector format in accordance with the present invention.

FIG. 2 illustrates an exemplary servo sector format 200 formatted with synchronization and control information. In the illustrated embodiment, the servo sector format 200 includes a preamble field 204, and encoded servo address mark (SAM) 208, an encoded Gray data field 212, a burst demodulation field 216 and a repeatable run out (RRO) data field 220. In one embodiment, the servo sector format 200 may use a 2T pattern of bits for timing synchronization, which allows the system to recover the timing and gain from the written servo data. The encoded SAM 208 is typically the same for all servo sectors and consists of a fixed number of bits. Encoded Gray data field 212 includes encoded track number and sector information, and coarse positioning information for the MR head 104. The burst demodulation field 216 includes fine positioning information that is used to keep the MR head 104 on track. Finally, RRO data field 220 includes head positioning information that is finer than that provided by the encoded Gray data field 212 and coarser than that provided by the burst demodulation field 216.

Figure 3:
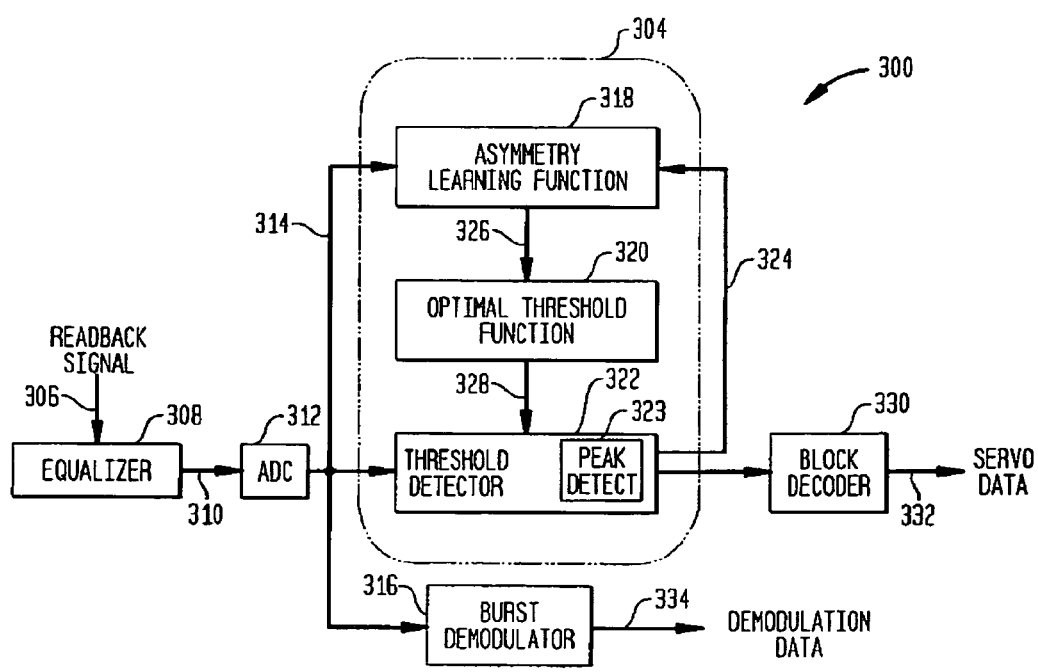
FIG. 3 illustrates one embodiment of an analog front end servo subsystem using an adaptive asymmetry control circuit in accordance with the present invention.

FIG. 3 illustrates one embodiment of an analog front end servo subsystem 300 using an adaptive asymmetry control circuit 304 to improve the performance of threshold detection in the presence of asymmetry in readback signal 306. In the illustrated analog front end servo subsystem 300, a readback signal 306, as obtained, for example, from a preamp 106, is a continuous-time analog waveform, which needs to be converted into digital samples that can be processed further. In one embodiment, readback signal 306 can be equalized in an equalizer 308 to a desired target partial response, thus shaping the readback signal frequency spectrum to a desired spectrum for improved detection performance. In some embodiments, equalizer 308 can include a continuous time filter (CTF) in tandem with a discrete time finite impulse response (FIR) filter, for example. Next, the equalizer output 310 is digitized using, for example, an analog to digital converter (ADC) 312, producing Y values 314 as an equalized sampled data stream. The Y values 314 are then input to the adaptive asymmetry control circuit 304 and a burst demodulator 316. The output of the adaptive asymmetry control circuit 304 is connected to a block decoder 330 which produces servo data 332. The burst demodulator 316 produces demodulation data 334. The servo data 332 and demodulation data 334 are used, for example, by a disk drive firmware control system to drive and position the head over a disk track.

In one embodiment, the adaptive asymmetry control circuit 304 contains an asymmetry learning function 318, an optimal threshold function 320, and a threshold detector 322. In accordance with one embodiment, the threshold detector 322 receives the Y values as wide bi-phase (WBP) encoded data. It is noted that WBP data converts a "0" to [1100] and a "1" to [0011]. The preamble 204, based on a 2T encoding pattern, consists of a repeating [0011] pattern. The code word boundaries in a data stream, such as servo sector format 200, are determined from the preamble 204. An exemplary data stream with a preamble is shown in bold, followed by WBP data shown in italics follows: 001100110011001111100001100111100. By using the preamble for synchronization, there is a positive peak every 4T which serves as a synchronization point to determine the codeword boundaries in the WBP data.

The readback digitized samples from the ADC 312 have also been equalized to an enhanced partial response class-4 (EPR4) [5 5 −5 −5] target. In accordance with this embodiment, the Y values 314 will then have either a positive peak (+20) or a negative peak (−20) at a code word boundary. The samples at the other positions depend on the previous codeword. For example, if the ADC samples are [01001], the WBP encoded samples, using subscripts to indicate the Y samples, become $[(1100)_0(0011)_1(1100)_0(1100)_0(0011)_1]$. The first row of Table 1 below shows the EPR4 equalized ideal digital samples corresponding to this pattern. Slicing the samples with a threshold of zero at the 4T positions, labeled as TD in the second row of Table 1, yields the original servo data [01001].

TABLE 1

| ... | −20 | −10 | 0 | 10 | 20 | 10 | 0 | −10 | −20 | 0 | 20 | 0 | −20 | −10 | 0 | 10 | 20 |
|---|---|---|---|---|---|---|---|---|---|---|---|---|---|---|---|---|---|
|  | TD |  |  |  | TD |  |  |  | TD |  |  |  | TD |  |  |  | TD |

It is noted that the [+20] and the [−20] ideal samples are equi-distant from the threshold of zero. Thus, even with noise spikes of [−18] or [+18], respectively, the data can be correctly converted. However, in the presence of asymmetry, the received samples will not be equi-distant from zero. Consequently, slicing the samples with a threshold of zero is no longer optimal. For example, with positive readback asymmetry, a set of EPR4 samples for the [01001] data could be as illustrated in the first row of Table 2 below, where it is noted that the samples have shifted to the positive side by +5. In the absence of further noise at a particular sampling point, a threshold of zero will still recover the servo data of [01001]. However, with noise in practical situations, a threshold detector with a threshold of zero is prone to more errors on the negative samples with a positive readback asymmetry. In the example shown in Table 2, the [−15] samples are more likely to be interpreted as positive samples with noise because they are closer to zero. For example, with the [−15] and the [25]

samples and with noise spikes of [+18] and [−18], respectively, the [−15+18]sample becomes a [+3} sample and the [25−18] sample becomes a [+7] sample. The negative samples in the presence of positive signal asymmetry become more sensitive to noise.

TABLE 2

| ... | −15 | −5 | 5 | 15 | 25 | 15 | 5 | −5 | −15 | 5 | 25 | 5 | −15 | −5 | 5 | 15 | 25 |
|-----|-----|----|----|----|----|----|----|----|----|----|----|----|----|----|----|----|----|
|     | TD  |    |    |    | TD |    |    |    | TD |    |    |    | TD |    |    |    | TD |

In order to compensate for the asymmetry in the readback signal 306, one embodiment of the invention advantageously learns the amount of asymmetry present in the readback signal 306 and determines an optimal threshold, which may be adaptively varied to more accurately detect the servo data. A learning process is used that is based on evaluating N pairs of negative and positive peak samples where N is a programmed value based on a consideration of learning time and performance of the adaptive asymmetry control circuit 304.

In order to learn the amount of asymmetry present in the equalized sampled Y values 314, positive or negative samples are generated based on an initial threshold value from a peak detector 323 as a peak sample output 324. N pairs of negative and positive peak samples taken at the code word boundaries are then summed and an average value of the pairs is determined in the asymmetry learning function 318, which then generates the average signal asymmetry value 326. The optimal threshold 328 is next determined in the optimal threshold function 320 to be the average signal asymmetry value 326 divided by two. For example, with N set to two and using the first row of the Table 2 as the sampled data, the pairs of negative and positive samples at code word boundaries are [−15,25] and [−15,25]. In accordance with this example, the average signal asymmetry value 326, for the N=2 pairs of samples, is 10. Half of the average signal asymmetry is 5, which is the optimal threshold 328. In another example, with the following N equal to four peak samples [−15,25], [−16, 26], [−13,25], and [−15,27], the average signal asymmetry is [10+10+12+12]/4=11, and the optimal threshold 328 is 11/2=5.5.

The optimal threshold 328 is then used as a threshold in threshold detector 322 to slice the servo data. The equalized sampled data stream 314 is again evaluated and the asymmetry is re-learned by collecting N pairs of samples at codeword boundaries in the asymmetry learning function 318. After collecting N pairs, a new optimal threshold 328 is calculated, and the previous value for the optimal threshold used in the threshold detector 322 is changed to adapt to the new optimal threshold.

Figure 4:
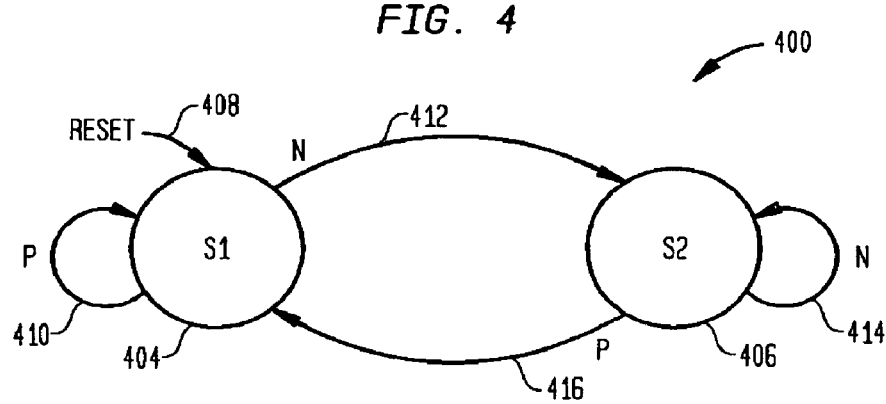
FIG. 4 illustrates a two stage state transition diagram for determining an ordered pair sequence of peak signal values in accordance with the present invention.

In accordance with one embodiment of the invention, the process to add a positive peak value followed by a negative peak value may be controlled by a two-stage state machine. FIG. 4 illustrates one embodiment of a two-stage state transition diagram 400 for determining an ordered pair sequence of peak signal values. The two-stage state transition diagram 400 illustrates the state transitions followed by the two-stage state machine having a first state S1 404 and a second state S2 406. The first state S1 404 is reached upon receiving a reset signal 408. Receiving a positive peak 410 keeps the state machine in state S1 404. Upon receiving a negative peak 412, the state machine transitions to state S2 406. While in state S2 406, receiving a negative peak 414 keeps the state machine in state S2 406. Upon receiving a positive peak 416, the state machine transitions back to state S1 404. The state machine keeps track of a sequence of a positive peak followed by a negative peak, which is generally represented by the transition from state S1 404 to state S2 406. The state machine may also keep track of a sequence of a negative peak followed by a positive peak, which is generally represented by the transition from state S2 406 to state S1 404. Both sequences can not be uniquely identified without reusing the peak data in a two-stage state machine.

Figure 5:
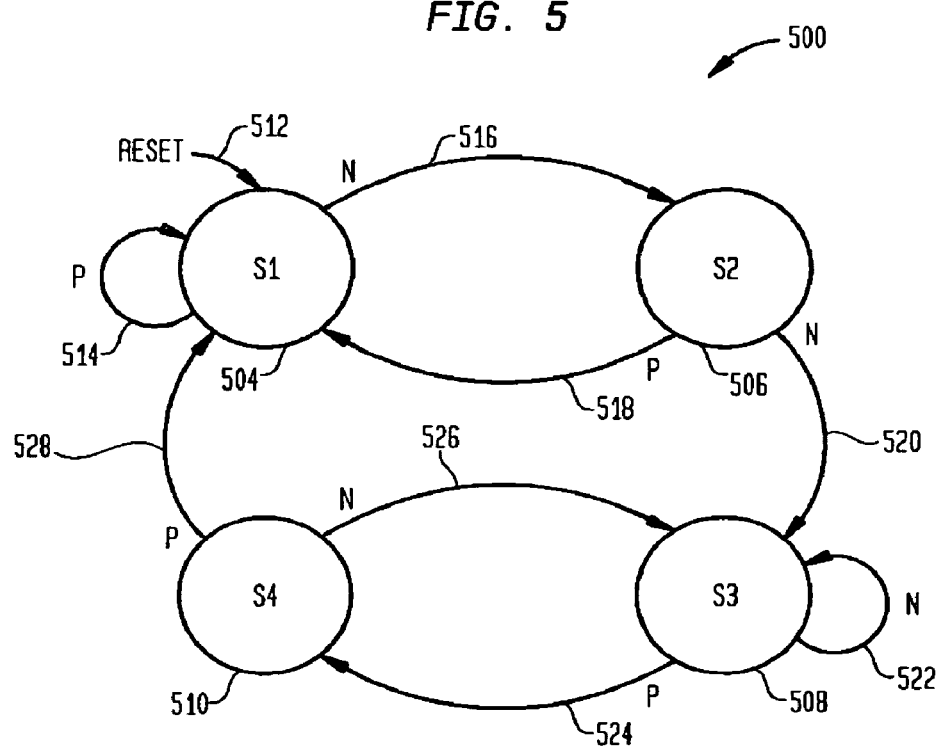
FIG. 5 illustrates one embodiment of a four stage state transition diagram for determining two types of ordered pair sequences of peak signal values in accordance with the present invention.

Without reusing peak data, a negative peak followed by a positive peak sequence, and a positive peak followed by a negative peak sequence, for example, may be uniquely identified in a four-stage state machine. FIG. 5 illustrates one embodiment of a four-stage state transition diagram 500 for determining two types of ordered pair sequences of peak signal values by using a four-stage state machine. The four-stage state transition diagram 500 illustrates the state transitions of the four-stage state machine, having a first state S1 504, a second state S2 506, a third state S3 508, and a fourth state S4 510. The first state S1 504 is reached upon receiving a reset signal 512. Receiving a positive peak 514 keeps the state machine in state S1 504. Upon receiving a negative peak 516, the state machine transitions to state S2 506. While in state S2 506, receiving a positive peak 518 causes the state machine to transition back to state S1 504. While in state S2 506, receiving a negative peak 520 causes the state machine to transition to state S3 508. While in state S3 508, receiving a negative peak 522 keeps the state machine in state S3 508. Upon receiving a positive peak 524, the state machine transitions to state S4 510. While in sate S4 510, receiving a negative peak 526 causes the state machine to transition back to state S3 508. While in state S4 510, receiving a positive peak 528 causes the state machine to transition back to state S1 504. In this fashion, the four-stage state machine may uniquely keep track of a sequence of a positive peak followed by a negative peak and a negative peak followed by a positive peak without reusing the peak data. A four-stage state machine is used, for example, to make use of all possible pairs of peak data without reusing the peak data, and thereby improving the performance of the learning process.

FIG. 6 illustrates one embodiment of an adaptive asymmetry control process 600, such as may be used, for example, in a disk recording system. An encoded readback signal 605 is equalized and then sampled, for example, using an analog to digital converter (ADC), in a first step 610. The codeword boundaries are determined from the sampled data in step 615 using, for example, preamble bits. In step 620, the sampled data is sliced at codeword boundaries based on a threshold. In step 625, the amount of asymmetry in the sampled signal is learned by summing N pairs of positive and negative peak values. In step 630, the result of the summation of N pairs of peak values is divided by N to determine an average signal asymmetry. In step 635, the average signal asymmetry is divided by 2 to determine the optimal threshold. In step 640, the threshold in step 620 is replaced by the optimal threshold determined in step 635.

For example, in a system using an adaptive asymmetry control process 600 and a 6T code, a "0" may be encoded as [000000] and a "1" may be encoded as [111111]. After EPR4 equalization and sampling, positive peaks of (+20) and negative peaks of (0) may be detected at code word boundaries every 6T following, for example, step 620 of FIG. 6. A sum of N pairs of positive and negative peak values is determined, in step 625, and an average signal asymmetry is determined by dividing the sum of N pairs by N, in step 630. The average signal asymmetry is divided by two to determine an optimum threshold, in step 635, such as (+10). The optimum threshold replaces the existing threshold in step 640. The optimum threshold is then used to detect servo data in the new system.

While the present invention has been disclosed in a presently preferred context, it will be recognized that the present teachings may be adapted to a variety of contexts consistent with this disclosure and the claims that follow.

For example, the present invention is disclosed mainly in the context of perpendicular recording. It will appreciated that it may also be employed with horizontal recording techniques. It will also be appreciated that variations in the particular hardware and software employed are feasible, and to be expected as both evolve with time.

Simulations with up to +/−40% signal asymmetry have shown that the adaptive asymmetry control circuit performs at least 0.5 dB better than a system without any controls for addressing signal asymmetry. Since the invention has a low cost of implementation, it is anticipated to be useful in other encoded servo systems. Other such modifications and adaptations to suit a particular design application will be apparent to those of ordinary skill in the art.

I claim:

1. A control circuit for adaptively controlling signal asymmetry comprising:
    a peak detector operable to supply at regular intervals positive or negative signal peak values of a sampled data stream;
    an asymmetry learning function operable to generate an average signal asymmetry value by averaging N pairs of positive and negative signal peak values, N being an integer greater than one;
    an optimal threshold function operable to generate an optimal threshold value by dividing the average signal asymmetry value by 2; and
    a threshold detector operable to slice the sampled data stream at regular intervals using the optimal threshold value as a threshold.

2. The control circuit of claim 1 wherein the regular intervals are at codeword boundaries.

3. The control circuit of claim 2 wherein the codeword boundaries are determined from a preamble pattern of the sampled data stream.

4. The control circuit of claim 1 further comprising:
    an equalizer operable to receive a readback signal and generate an equalized readback signal; and
    an analog to digital converter (ADC) operable to receive the equalized readback signal and sample the equalized readback signal to generate an equalized sampled data stream.

5. The control circuit of claim 4 wherein the readback signal is a signal from a read head circuit in a disk drive system.

6. The control circuit of claim 1 further comprising:
    a two-stage state machine for determining an ordered pair of positive and negative signal peak values.

7. The control circuit of claim 6 wherein the ordered pair of positive and negative signal peak values is a positive signal peak value followed by a negative signal peak value.

8. The control circuit of claim 6 wherein the ordered pair of positive and negative signal peak values is a negative signal peak value followed by a positive signal peak value.

9. The control circuit of claim 1 further comprising:
    a four-stage state machine for determining two types of ordered pairs of positive and negative signal peak values.

10. The control circuit of claim 9 wherein a first type of ordered pair is a positive signal peak value followed by a negative signal peak value and a second type of ordered pair is a negative signal peak value followed by a positive signal peak value.

11. The control circuit of claim 1 wherein an optimal threshold value is determined every N pairs of positive and negative signal peak values.

12. A method for adaptively controlling signal asymmetry in a disk drive system, the method comprising:
    detecting at regular intervals positive or negative signal peak values of a sampled data stream;
    adding N pairs of positive and negative peak values to produce a summation value; dividing the summation value by N to produce an average signal asymmetry value; dividing the average signal asymmetry value by 2 to produce an optimal threshold value, N being an integer greater than one; and
    slicing the sampled data stream at regular intervals using the optimal threshold value as a threshold in a threshold detector.

13. The method of claim 12 further comprising:
    equalizing a readback signal from a read head circuit in the disk drive system; and sampling the equalized readback signal to produce an equalized sampled data stream.

14. The method of claim 12 wherein the pairs of positive and negative signal peak values are ordered pairs of signal peak values.

15. The method of claim 14 further comprising:
    initializing a two-stage state machine to a first state; receiving a negative signal peak value;
    transitioning the two stage state machine from the first state to a second state; receiving a positive signal peak value; and
    transitioning the two stage state machine from the second state back to the first state, whereby an ordered pair of negative signal peak value followed by a positive signal peak value is determined.

16. The method of claim 12 wherein N is a programmable value representing the number of pairs of positive and negative signal peak values to be processed to determine an optimal threshold value.

17. An asymmetry learning circuit for learning read head signal asymmetry in a disk drive system comprising:
    an analog front end circuit operable to generate a sampled data stream based on signals received from a read head;
    a peak detector operable to supply at regular intervals positive or negative signal peak values of the sampled data stream;
    an asymmetry learning function operable to generate a learned average signal asymmetry value by averaging N pairs of positive and negative signal peak values, N being an integer greater than one;
    an optimal threshold function operable to generate an optimal threshold value by dividing the learned average signal asymmetry value by 2; and
    a threshold detector operable to slice the sampled data stream at regular intervals using the optimal threshold value producing a sliced data stream.

18. The asymmetry learning circuit of claim 17 further comprising:
   a multi-stage state machine for determining multiple types of ordered groups of signal peak values.

19. The asymmetry learning circuit of claim 17 wherein the signals received from the read head are wide bi-phase (WBP) encoded data.

20. The asymmetry learning circuit of claim 17 wherein the sampled data stream is equalized to an enhanced partial response class-4 (EPR4) target.

* * * * *